Feb. 2, 1926.
L. J. MADDEN
1,571,339
ADJUSTABLE CUTTER DRILL
Filed April 17, 1922
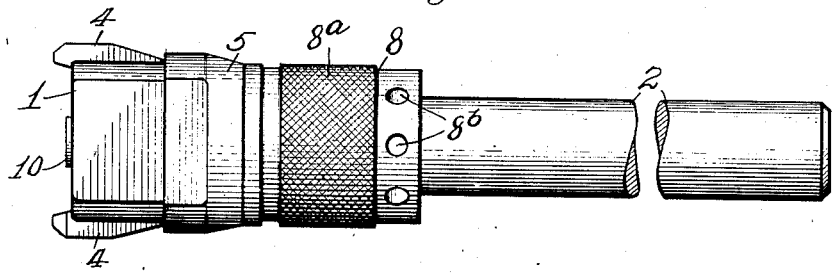
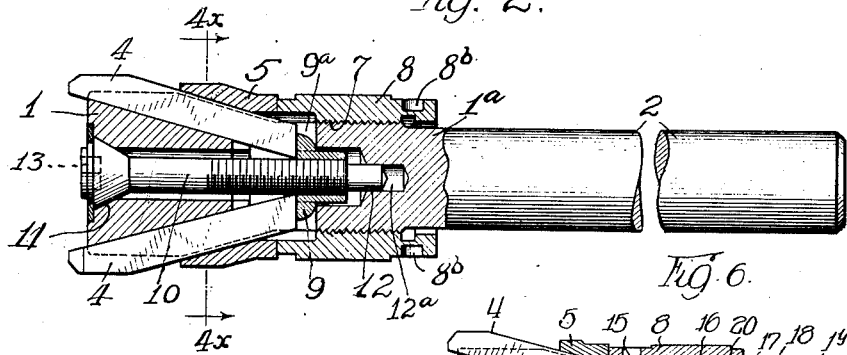
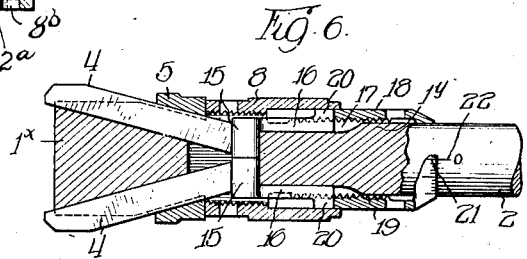
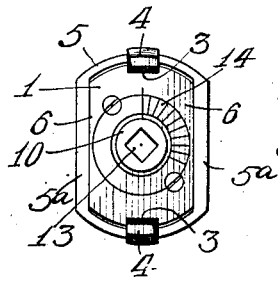
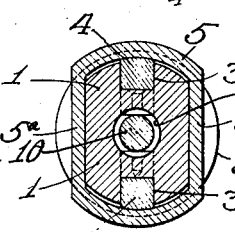
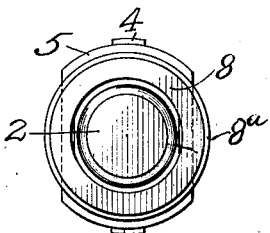
Witness:
R. Burkhardt
Inventor
L. J. Madden,
By Wilkinson, Huxley, Byron & Knight
Attys Patented Feb. 2, 1926.

1,571,339

UNITED STATES PATENT OFFICE.

LOUIS J. MADDEN, OF SYRACUSE, NEW YORK, ASSIGNOR OF ONE-HALF TO JOHN L. WAGNER, OF SYRACUSE, NEW YORK.

ADJUSTABLE CUTTER DRILL.

Application filed April 17, 1922. Serial No. 553,705.

*To all whom it may concern:*

Be it known that I, LOUIS J. MADDEN, a citizen of the United States, residing at Syracuse, in the county of Onondaga and State of New York, have invented certain new and useful Improvements in Adjustable Cutter Drills, of which the following is a specification.

This invention relates to a revolving drill of the type in which a pair of wing-like blades protrude beyond the body of the tool to present their edges in cutting position, and in which these blades are longitudinally adjustable on diverging lines in order that the diameter of the bore which the tool produces may be varied at will.

The object of the present invention is to provide a simple and durable construction of adjustable drill of the type described, and one that will permit of very accurate adjustment. Accordingly, the invention consists in constructing the body of the tool with divergent seats for the blades, and a clamping yoke which embraces the blades and holds them firmly to the various positions on their seats to which they are adjusted and which embraces a non-circular section of the body to prevent relative rotation between the yoke and the body; an axial bore being formed in the body which intersects the seats so that an adjusting screw arranged longitudinally of the body between the blades, seating at its forward end in the body, and carrying a wing nut upon its rear end which provides abutments for the blades, can be employed to adjust the blades to a nicety and determine with accuracy the size of bore to be formed.

In the accompanying drawing—

Figure 1 is a side elevational view, and Figure 2 an axial sectional view of a tool in which the several features of the invention are embodied.

Figure 3 is a front end view; Figure 4 a section on the line 4ˣ—4ˣ of Figure 2; and Figure 5 a rear end view of the tool. Figure 6 is a view similar to Fig. 2 showing a modification.

1 represents the body of the tool, and 2 the shank joined thereto by the neck $1^a$. The body 1 is formed with a pair of diametrically opposite externally opening slots 3, the bottoms of which are inclined forwardly and outwardly with respect to the axis of the tool, and constitute a pair of divergent seats for cutting blades 4. The blades 4 are releasably confined in their seats and held against longitudinal movement by means of a yoke 5 which embraces the blades and is free to slide to and from their inclined outer faces, but is held against rotation upon the body by having its cheeks $5^a$ conform to the flat faces 6 of the body. Yoke 5 is forced into binding relation to the outer faces of the blades 4 by means of a follower 8 which is fitted upon threads 7 of the neck $1^a$ of the body, and is knurled at $8^a$ and provided with spanner sockets $8^b$ to facilitate turning it.

9 represents a wing nut confined against turning in a recess $9^a$, threaded upon the rear end of an axially disposed screw 10, and serving as an abutment for the blades 4. Screw 10 is seated at 11 in the forward end of the body 1, may be guided by its reduced rear end 12 turning in a socket $12^a$, and has a key socket 13 at its front end by which it can be rotated to feed the wing nut 9 backward or forward and determine the longitudinal adjustment of the blades 4, and therefore the diameter of the bore which they will form in use. Surrounding the forward end of screw 10 is a graduated ring 14 which can be used to determine the angle of rotation of the screw 10, and therefore the degree of adjustment of the blades. By suitably calibrating the scale 14 it can be made to read in terms of the diameter of the bore which the blades will form, as the result of any given angular adjustment of the screw.

In adjusting the tool, follower 8 will be turned backward sufficiently to release the grip of the yoke 5 upon the blades 4. Screw 10 will then be rotated to develop the proper rating of its marker upon the scale 14, and yoke 5 may then be tightened upon the blades by screwing the follower 8 forwardly, care being taken to see that the blades are firmly seated against the wing nut 9.

According to Figure 6, the body $1^x$, with the same construction of seating slots 3 containing blades 4, clamping yoke 5, and adjusting sleeve 8, has a solid front end, and the abutments for the seats comprise a pair of radially disposed studs 15 carried by gibs or keys 16 working in slots 17 of the neck $1^y$, while an adjusting sleeve 18 threaded upon the neck at 19 and engaging the shoulders 20 on the keys 16, is adapted to set the seats 15 forward with accuracy and to any particular degree indicated by the scale 21 in registry with a marker 22. In other respects, the tool embodying these details of construction operates as already described in connection with Figures 1 to 5.

I claim:

1. In an adjustable cutter drill, a body having longitudinally disposed divergent grooves and constructed with flat external faces, blades seated in said grooves with longitudinal adjustment therein, a yoke embracing said blades, confining them in said grooves and having flat cheeks embracing the flat faces of the body to hold the yoke against rotation while permitting it to slide longitudinally of the body, a rotatable follower threaded upon the body in rear of said yoke, an adjusting screw axially disposed in the body, and a wing nut threaded on said screw in position to afford abutment for the rear ends of the blades.

2. In an adjustable cutter drill, a body constructed with divergent longitudinally disposed grooves and with a non-circular transverse section, cutting blades seated in said grooves, a yoke conforming to the section of the body and thereby held against rotation on the body, embracing the blades and movable independently of them to bind them in the grooves, a rotatable follower threaded upon the body above the yoke, and means for adjusting the blades in the body when released by the yoke.

Signed at Syracuse, New York, this 12th day of April, 1922.

L. J. MADDEN.